(12) United States Patent
Cooper

(10) Patent No.: US 6,751,926 B1
(45) Date of Patent: *Jun. 22, 2004

(54) PACKAGING FILLER PRODUCT AND MACHINE FOR PRODUCING SAME

(76) Inventor: Andrew Cooper, 7931 Deering Ave., Canoga Park, CA (US) 91304

( * ) Notice: Subject to any disclaimer, the term of this patent is extended or adjusted under 35 U.S.C. 154(b) by 0 days.

This patent is subject to a terminal disclaimer.

(21) Appl. No.: 10/104,074

(22) Filed: Mar. 21, 2002

Related U.S. Application Data (63) Continuation-in-part of application No. 09/565,161, filed on May 3, 2000, now Pat. No. 6,460,313.
(60) Provisional application No. 60/133,814, filed on May 11, 1999.

(51) Int. Cl.[7] ............................................. B65D 81/18
(52) U.S. Cl. ............................. 53/79; 53/562; 53/568; 53/558
(58) Field of Search ..................... 53/562, 568, 567, 53/468, 79, 403, 558

(56) References Cited

U.S. PATENT DOCUMENTS

| | | | | |
|---|---|---|---|---|
| 2,738,828 A | * | 3/1956 | Hammer | 156/289 |
| 3,359,703 A | * | 12/1967 | Quaadgras | 53/493 |
| 3,791,573 A | * | 2/1974 | Titchenal et al. | 229/69 |
| 3,813,845 A | * | 6/1974 | Weikert | 53/469 |
| 4,617,785 A | * | 10/1986 | Chikatani et al. | 53/562 |
| 5,174,088 A | * | 12/1992 | Focke et al. | 53/431 |
| 5,315,807 A | * | 5/1994 | Restle et al. | 53/51 |
| 6,460,313 B1 | * | 10/2002 | Cooper | 53/79 |

* cited by examiner

Primary Examiner—Stephen F. Gerrity
Assistant Examiner—Thanh Truong
(74) Attorney, Agent, or Firm—Roger A. Marrs (57) ABSTRACT

A machine for producing a packaging filler material employing inflated pouches or cells fabricated from a tubular supply of plastic-like material having a top and bottom integral fold so that a pair of sheets are defined with their opposing inner surfaces establishing a compartment. Sealed strips, which are spaced apart in parallel relationship, define the sides of each pouch compartment. The machine includes a first work station having a source of tubular material that is introduced to a second or cutter station for severing the top fold of the tubular material followed by introduction to a third or inflation station where a source of pressurized fluid is fed to the pouch compartment. A sealing station follows the inflation station where the top opening to the pouch is closed such as by heat sealing. Idler rollers smoothly conduct the material past each of the respective work stations in a serial fashion and provide a gap for effecting inflation. An advancing system in the form of a rotary drive drum and a pressure belt cooperate to transport the supply material about the idler rollers with the pouches being introduced to each operational station.

17 Claims, 5 Drawing Sheets

PACKAGING FILLER PRODUCT AND MACHINE FOR PRODUCING SAME

Priority claimed as a continuation-in-part on Ser. No. 60/133,814 filed May 11, 1999 abandoned and Ser. No. 09/565,161 filed May 3, 2000 issued as U.S. Pat. No. 6,460,313.

BACKGROUND OF THE INVENTION

1. Field of the Invention

The present invention relates to the field of packaging materials, and more particularly to a novel package filler material used in shipping or transporting fragile articles and which has shock-absorbing capabilities and a machine for making such packaging filler material whereby the user may readily dispense, on site, a quantity of such filler material from a machine which fabricates the filler material in the form of inflated pouches or cells detachably connected together in an in-line series for subsequent separation and use.

2. Brief Description of the Prior Art

In the past, it has been the conventional practice to provide a packaging filler material for protecting fragile articles and composed of small masses of foam composition, such as composed from polystyrene or polyethylene. Such packaging material is used as fillers or stuffers in a storage compartment so as to protect fragile products when transported from one place to another either by commercial or government handling authorities. Such plastic-like pieces of foam are sometimes referred to as "peanuts" because of their peanut-like shape, and in other instances, the foam composition is of irregular form or of special form conforming in shape to the article being transported in the carton. In the instance of "peanuts", such foam composition is purchased in large bags from a manufacturer and kept in inventory at the user's site of shipment until ready for usage. This represents a relatively uneconomical means for such packaging material since it requires space for storage at the site of usage and must be purchased before usage from the outside manufacturing sources. In some instances, problems have been encountered by the receiver of shipped packages containing such conventional foam material which stem from disposal problems since some plastic foam compositions are not acceptable for recycling procedures.

Another prior packaging filler material takes the form of a unitary sheet having singular or a multiplicity of integrally formed air bubbles or pouches that are connected together on the sheet and are not separable. Such sheets are manufactured off-site from their location of use and are generally stored in rolls at the location of use after purchase and supply by the manufacturer as noted above. Also, the user must either fold the sheet to fit the article to be shipped, or specifically cut the sheet to accommodate the package.

Most all presently availalbe package fillers, such as "Popcorn", "Peanut" or "rows of bubbles" are made in factories requiring vast floor space to manufacture and inventory the volume of package filler material distribution. This procedure requires further processing energy as well as other resources that are wasted. Shipment and distribution to the using site requires packing in storage bags, barrels, cartons or the like.

Attempts to provide on-site fabrication machinery for producing a quantity of shock absorbing cells is disclosed in U.S. Pat. No. 5,216,868 while other machines and pouches are disclosed in U.S. Pat. Nos. 3,340,669; 4,747,253; and 5,552,003. Although successful for the machinery's intended purposes, the prior machines require considerable moving parts, timing functions and control stations. These create problems and difficulties that need to be avoided for on-site manufacture and use of package filler materials. Also, slippage of the bulk material in the advancing system of conventional machines causes problems in pouch inflation as well as in sealing of the pouches.

A conventional packaging filler product and a known machine for making the product is disclosed wherein the product includes a plurality of air-filled pouches defined between a pair of sheets in which each pouch includes sealed edges connecting the opposing sheets of the pouch together to provide a shock-absorbing "pillow" construction. The machine includes a pouch advancing system for moving a bulk sheet supply of pouched package material past an inflation device for serially inflating the interior of each pouch of the package material followed by employing a sealer system that seals the opening into the interior of each pouch to retain inflation. However, the advancing system fails to maintain pouch inflation during the inflation procedure as leakage occurs prior to sealing of the pouch. Also, speed of production is greatly limited since frequent stopping of the bulk supply advance is necessary in most conventional machines.

Therefore, a long-standing need has existed to provide a novel packaging filler material which need not be stored in inventory at the point of manufacture and shipment, but which may be fabricated by the user on-site at the time that such material is needed. The on-site fabricated product will not only protect the object being shipped in the carton or package but can be disposed of by the recipient once the package has been opened and the shipped article removed. Furthermore, such a desired packaging material must be relatively inexpensive to manufacture as compared to foam or foam-like compositions. Preferably, the production of the packaging material should avoid the creation of waste or scrap and the inflation and sealing of individual pouches as well as the advancement system for the bulk supply must be kept to a simple and uncomplicated procedure.

SUMMARY OF THE INVENTION

Accordingly, the above problems and difficulties are avoided by the present invention which provides a novel machine for producing a packaging filler material comprised of at least one or more inflated pouches or cells fabricated from a tubular supply of plastic-like material having a top and bottom integral fold so that a pair of sheets are defined therebetween with their opposing inner surfaces establishing the pouches or cells. Sealed strips, which are spaced apart in parallel relationship, define the sides of each pouch. Such a machine includes several processing or work stations with the first station being a source of tubular material that is introduced to a cutter station for severing the top fold of the tubular material followed by introduction to an inflation station where a source of pressurized fluid is fed to the top cut fold into the pouch defined by the opposing inner surfaces thereof. A sealing means follows the inflation station where the top opening to the pouch is closed such as by heat sealing and a plurality of idler rollers smoothly conduct the material past each of the respective stations in a serial fashion. An advancing system in the form of a rotary drum and belt drive cooperate to transport the supply material about the idler rollers with the respective pouches being introduced to each operational station. Individual pouches or cells may be separated from the bulk sheet material by separating the selected pouches or cells along perforations in the sealed strips.

In one form of the machine, the tubular supply of material with pre-formed pouches or cells is fed to the inventive machine sequenced so that the series of multiple stations will effect cutting of the top fold of the tubular supply, inflation of each pouch or cell followed by sealing each pouch or cell along its length to define a plurality of inflated pouches or cells.

Therefore, it is among the primary objects of the present invention to provide a novel packaging or filler material which is an inflated pouch or cell and which may be combined with other separate pouches or cells to form a shock-absorbing and stuffing material to be carried in cartons or shipping containers about a fragile object to be transported.

Another object of the present invention is to provide a novel packaging material that may be readily produced at the site of shipping and which may comprise one or more air-filled pockets or cells in a strip for use in the shipping process.

Another object of the present invention is to provide a novel machine for producing a series of air-filled pouches, pockets or cells in a strip so that the user may dispense as many pouches as required for article protection purposes during a shipping.

Still a further object of the present invention is to provide a novel machine for producing a package material for article protection that is produced from a tubular supply having a continuous series of pouches that is initially opened, inflated and sealed to enclose air, followed by dividing the air-filled pouches into a plurality of inflated pouches in an end-to-end relationship.

Another object relates to the subsequent disposal of the inventive pouches, pockets or cells which permits ready deflation and destruction of used material for environmental purposes such as recycling.

A further object resides in using a tubular supply of material that is flattened with two material sheets joined at top and bottom edges by folds which is then formed into a series of pouches that are inflated and sealed and useful as filler material to protect fragile articles being shipped.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 4 is an enlarged top plan view of the machine for producing the inflatable package product illustrated in FIG. 3;

DESCRIPTION OF THE PREFERRED EMBODIMENT

Figure 1:
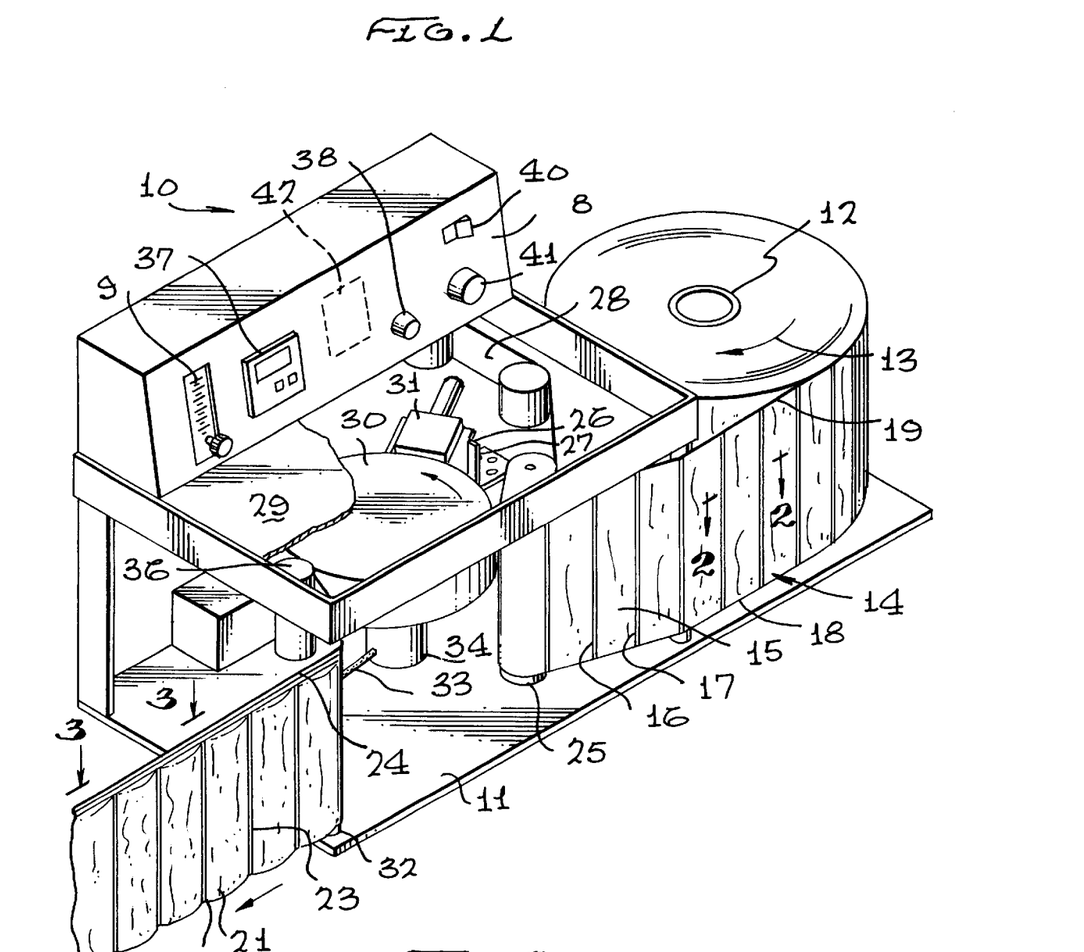
FIG. 1 is a front perspective view showing the novel packaging machine for making a plurality of inflatable pouches or cells in accordance with the present invention.

Referring to FIG. 1, the novel packaging filler product machine is indicated in the general direction of arrow 10 which includes a base 11 on which a spool 12 is rotatably located. The spool serves to mount an elongated sheet of product material in a roll so that it can be withdrawn from the roll in the direction of arrow 13. The elongated sheet of material is indicated by numeral 14 and a portion of the material is illustrated as being drawn from the roll and is trained past a various number of work stations for inflating and sealing a plurality of pouches or pockets formed in the sheet material 14. As the sheet or product material enters the machine 10, the plurality of pockets, such as a pouch or pocket 15, are deflated and are separated from adjacent pouches, pockets or cells by means of a sealed seam, indicated by numerals 16 and 17 on opposite sides of the pouch 15. The lower end of the product material is indicated by numeral 18 and represents a fold line while numeral 19 indicates an upper fold line. Therefore, the bulk supply of product material is a tubular construction illustrated in a flattened condition with opposite sheets joined by the upper and the lower fold lines. As the product material exits from the machine 10, the respective cells are inflated and a typical inflated cell is indicated by numeral 21 defined between heat-sealed seams 22 and 23. However, the exiting sheet material is sealed at the top and the sealed top is indicated by numeral 24.

FIG. 1, in general, further discloses that the machine includes a idler roller 25 which is employed for tensioning purposes as the sheet material passes about the roller and is introduced to a top fold cutter and to an inflating station which includes a blade cutter and an inflation manifold 26 with an inflation tube or nozzle 27 positioned over the sheet material as it is drawn into the station by means of a belt 28 in combination with a rotatable drive drum 30. Next, the sheet material and the individual pouches after inflation are passed to a sealing means 31 and eventually the inflated and sealed plurality of pouches or cells are passed about a roller 36 for discharge from the machine. Inflation occurs when a source of pressurized air is introduced to the manifold 20 by means of a hose 33 connected to the inflation tube 27.

The sheet material advancing or drive mechanism for moving the supply sheet 14 from station to station about the rollers and between the supply and discharge ends of the machine are represented by a drive motor 34 operating through the drive drum 30 which bears against a portion of the material 14. It is to be particularly noted that the belt 28 is trained about the major top edge portion or periphery of the material 14 urging the material against the drive drum. Therefore, as the upper edge of the sheet material 14 is pulled from the supply roll past the idlers, the belt 28 grips and presses the sheet material against the periphery of drum 30. Drum 30 serves as a backing plate for heat sealer 31. The cutter and manifold 26 are not fixed to the drum but are stationary and downwardly depending from the underside of a housing panel 29. The inflation means via hose 33 is operably connected to the inflation tube 27 by conventional means.

A control panel 8 is illustrated behind which several controls are located. For example, a sliding control 9 may be employed for regulating power and may include a scale or the like. A temperature controller is illustrated by numeral 37 while a speed control is indicated by numeral 38. Power switch 40 is operably connected to a source of power for energizing the motor 34 as wll as for supplying power to the heater 31 and inflation means. It is preferred that a separate start/stop button 41 by employed on the control panel 8 and all the electrical units may be carried on a circuit board 42 within the cabinet behind the panel 8.

Figure 2:
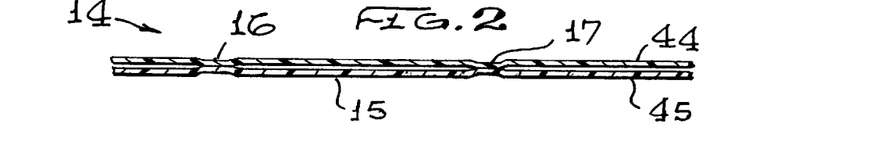
FIG. 2 is an enlarged longitudinal sectional view of a plurality of pouches or cells as stored in bulk on a feed spindle preparatory for introduction to the inflation station of the machine.

Referring in detail to FIG. 2, it can be seen that the supply sheet of material 14 is not inflated and that the seams 16 and 17 define an enclosed pouch 15 between the seams. The pouch is defined by a pair of sheet walls or layers 44 and 45 which are joined by upper fold 19 shown in FIG. 1, and lower fold 18.

Figure 3:
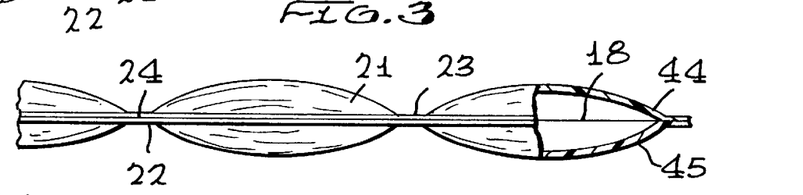
FIG. 3 is a view similar to the view of FIG. 2 illustrating a series of inflated pouches or cells as a finished product discharged from the machine.

In FIG. 3, the pouches have been inflated and the top openings to the pouches or cells have been sealed by the heat-sealing mechanism 31 along the upper edge 24. The bottom fold joining the sheets 44 and 45 together is indicated by the numeral 18. The array or series of pouches is ready for use singularly or in groups.

Referring now to FIG. 4, a diagrammatic view of the package filler machine is illustrated wherein the pre-formed pouch tubular supply material 14 is trained over a guide roller 46 where the material then progresses to the idler roller 25. About the peripheral edge of the roller 25, the sheet material is engaged by the pressure belt 28 which engages with the upper edge of the sheeting material and as the belt and sheeting material move from the idler 25, the material upper fold edge is pressed against the peripheral side of the drive drum 30. Therefore, as the belt provides pressure to force the sheeting against the periphery of drive drum 30, a frictional engagement ensues and the sheeting material will move along accordingly. As the drum 30 rotates, the pressed together material and belt move. The extreme terminating and upper fold edge 19 of the sheeting material passes along a series of idlers, indicated by numerals 53, 51 and 52 respectively. Idler wheel or roller 52 is offset from the rollers 51 and 53 so as to permit the cutter and inflation manifold 26 to reside adjacent the upper fold edge of the sheeting material adjacent to the periphery of drum 30. The idler 52 also permits separation of the belt 28 from the material sheeting 14 so that cutting of the top fold occurs and the inflation tube or nozzle 27 can introduce a pressurized fluid such as air into each of the respective cells or pouches in a serial sequence. Once a pouch has been filled with air, the belt 28 re-engages the exterior surface of the sheeting material and presses the top against the drum periphery so that the air cannot escape from the inflated cell or pouch. As the belt further drives the sheeting material which is now composed of a plurality of sequential inflated cells or the like, the sheeting material is introduced to a heat-sealing station and to the heater 31.

According to a timing sequence, the heater 31 is moved rectilinearly by means of a cylinder 54. When the piston 55 moves in and out of the cylinder 54, the heating shoe 56 engages with or comes into contact with the upper edge of the sheeting material 14 and causes a heat seal across the top of the sheeting material to seal the air within each of the respective pouches or cells. It is an important feature to note that after inflation, the belt 28 re-engages with the top of the sheet material between roller 53 and the heater 31. Thus, deflation of the cells or pouches is prevented since the cut top of the sheeting material is maintained closed as the material is pressed between the belt 28 and the peripheral surface of the drive drum 30.

Once the sheeting material leaves the heater 31, the pouches and cells are inflated and sealed and progress along against the peripheral surface of the drum 30 for discharge beyond the roller 32.

Tension for the pressure belt 28 is achieved by means of a spring tension device taking the form of a roller 57 about which the belt is trained. The roller 57 is mounted on a plate 58 that is spring-loaded by means of coil spring 60. Adjustment of the tension on spring 60 will place a tension on the endless belt 28. The tension device for belt 28 is pivotally carried on the housing by pivot 61.

Figure 5:
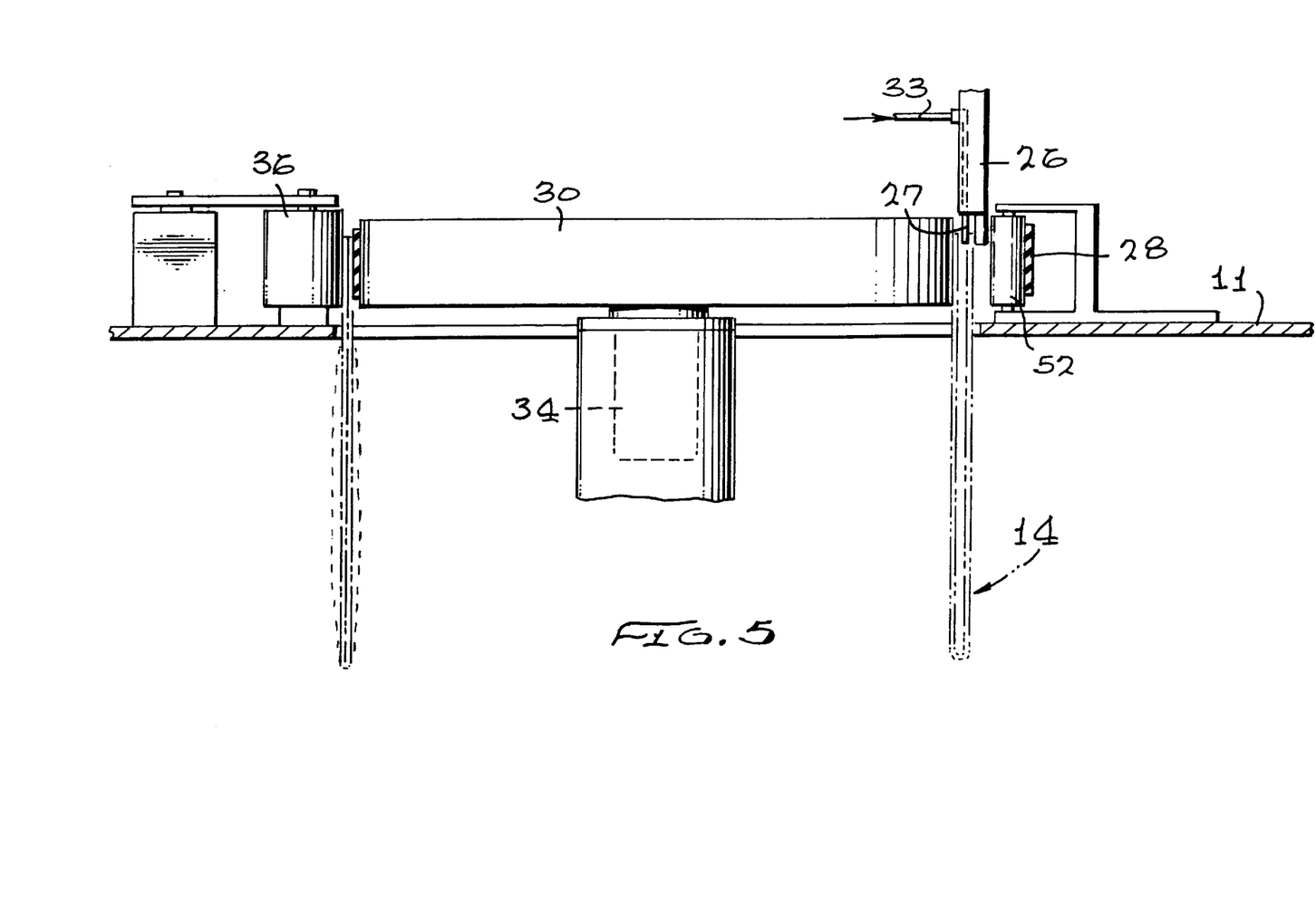
FIG. 5 is a transverse cross-sectional view of the machine shown in FIG. 4 as taken in the direction of arrows 5-5 thereof.

Referring in detail to FIG. 5, it can be seen that the drum 30 is rotatably carried on the post 34 and that the supply of pressurized air is introduced to the manifold 26 by means of hose 33 which passes into operable engagement with the manifold 26. Discharge of the pressurized air into the respective cells or pouches on the sheeting material is achieved vis inflation tube or nozzle 27. During the inflation procedure at the inflation station, the belt 28 is separated from the sheeting material by idler roller 52. The inflation nozzle 27 downwardly depends from the end of manifold 26 and is in alignment with the center idler roller 52. It is to be kept in mind that the disposition of the nozzle during the inflation procedure is extremely short and that the sheet material 14 is moving rapidly from the inflation station to the heating station and that the injected air into the cells and pouches is maintained from leaking or discharging because of the subsequent engagement of belt 28 with the sheeting material after leaving the inflation station. Also, it can be seen that the idler roller 36 causes the pressure belt 28 to leave engagement with the inflated sheeting material 14 as the material passes beyond the roller 36.

Figures 6, 7:
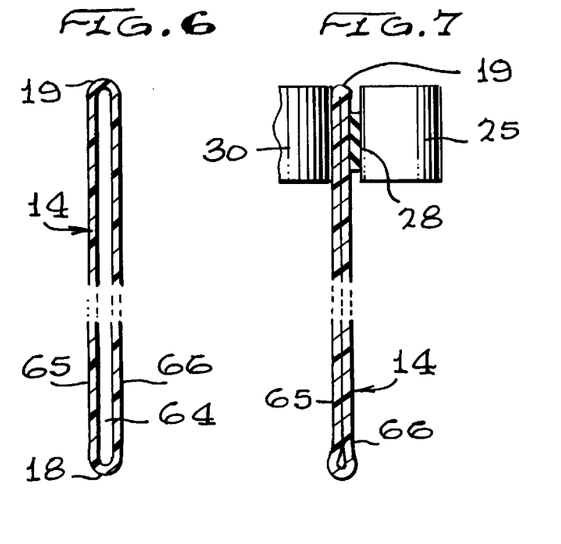
FIG. 6 is an enlarged transverse sectional view of the package material as it is introduced to the machine as shown in the direction of arrows 6-6 of FIG. 4.
FIG. 7 is a view similar to the view of FIG. 6 illustrating engagement of the package material with a driving belt as being pressed against a rotatable drum taken in the direction of arrows 7-7 of FIG. 4.

Referring now in detail to FIG. 6, the initial sheeting material 14 takes the form of a single unitary tubular sheet of flexible material which is folded at its top by fold 19 and at its bottom by fold 18 so as to provide an interior storage area 64 intended to be occupied by the pressurized fluid such as air. Front and back sheets 65 and 66 of the sheeting material 14 serve as sidewalls to maintain the cells inflated.

However, initially, the folded sheet material is closed at the top and the bottom, as indicated by numerals 18 and 19.

In FIG. 7, it can be seen that the belt 28 engages the outside upper surface of the sheet material 14 so as to press that portion of the supply or sheeting material against the outer periphery of the drum 30.

Figure 8:
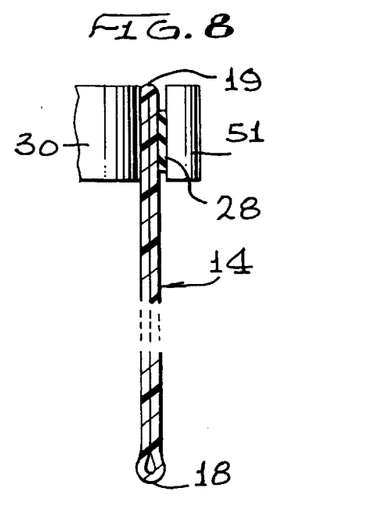
FIG. 8 is a transverse cross-sectional view of the package material in a position preparatory for inflation as taken in the direction of arrows 8-8 of FIG. 4.

FIG. 8 illustrates the inflation station wherein the sheeting material 14 has now been advanced past the roller 25 so as to enter a cutting and an inflation station via idler roller 51.

Figures 9, 10, 11, 12:
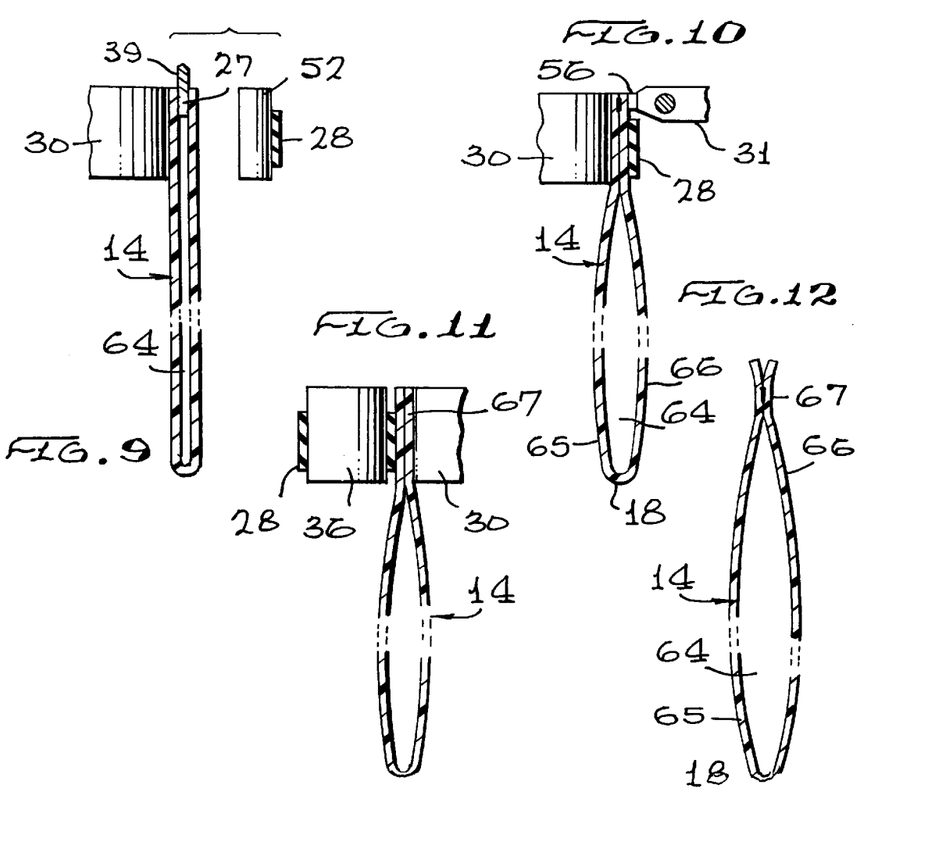
FIG. 9 is a cross-sectional view of the package material at the top fold cutting and inflation station as shown in FIG. 4 as taken in the direction of arrows 9-9 thereof.
FIG. 10 is a sectional view illustrating advancement of the package material by the belt and rotatable drum system subsequent to inflation and advanced to a heat-sealing station as taken in the direction of arrows 10-10 in FIG. 4.
FIG. 11 is a sectional view of the inflated package material advanced to a discharge station after heat-sealing, as shown in FIG. 4 in the direction of arrows 11-11 thereof.
FIG. 12 is a transverse cross-sectional view of a typical inflated pouch or cell taken in the direction of arrows 12-12 of FIG. 4.
Figure 14:
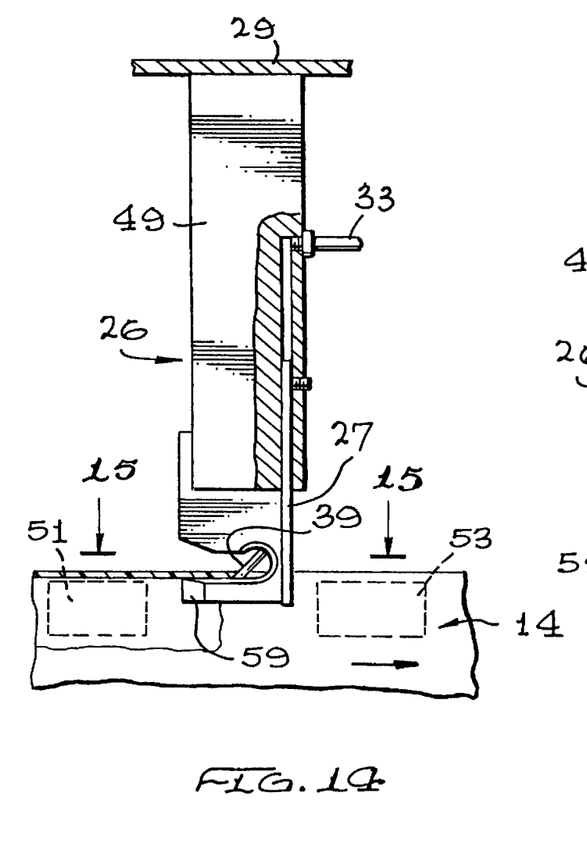
FIG. 14 is a perspective view of the cutter and inflation device.

Next, in FIG. 9, the belt 28 is released from engagement with the sheeting material 14 by passing about idler 52 so a cutting blade 39 immediately ahead of the nozzle 27 can sever the top fold 19. FIG. 14 shows the cutter 39. The inflation nozzle 27 inserts in the slit created by the cutter and introduces pressurized air into the storage compartment 64 between sheets 65 and 66, as shown in FIG. 9. As the sheeting material 14, which now has inflated pouches or cells, moves from the inflation station to the sealing station, as shown in FIG. 10, the shoe 56 of the heater 31 engages the uppermost edge of the sheet material 14 to effect a sealing closure to encapsulate or fully enclose the pressurized compartment 64. In this fashion, the pressurized air within storage compartment 64 is prevented from leaking or exhausting from the respective pouches or cells.

In FIG. 11, the series of inflated cells of the sheet material 14 now travel beyond the idler roller 35 for the belt 28 so that the sheeting material can readily be discharged from the housing. The upper edge of the sheeting material 14 is identified by numeral 67 which represents a sealed closure for each of the respective cells or pockets.

Figure 13:
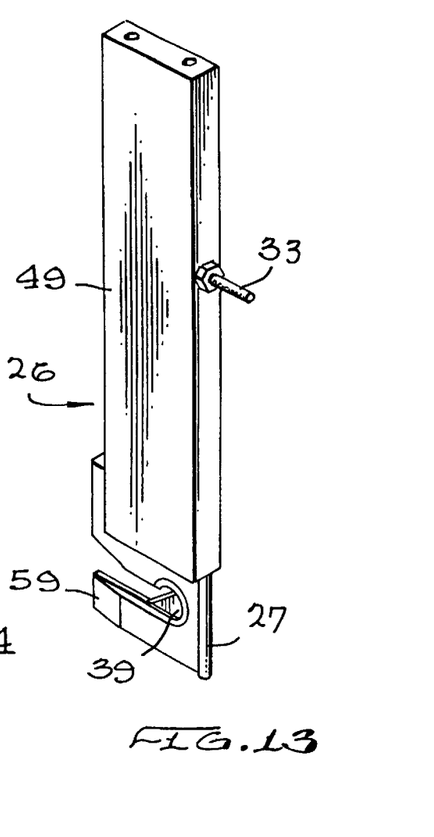
FIG. 13 is an enlarged side elevational view of the cutter and inflation devices.

In FIG. 12, a completed product is illustrated which is heat-sealed, as indicated by numeral 67, and wherein pressurized air is within the storage compartment 64, defined by opposite sidewalls or sheets 65 and 66. The fold 18 seals or prevents evacuation of pressurized air in the storage compartment 64. The cutter and inflation means 39 and 27 downwardly depend from a housing cover or panel that is mounted ahead of the panel 8 and is indicated by numeral 29 in FIG. 1. Both the cutter 39 and inflation tube or nozzle 27 are disposed on a support 49 attached to the underside of the panel 29 as shown in FIGS. 13 and 14. The cutter means include a blade 39 and a guide 59 that not only cuts the fold 19 but separates the top of sheets 65 and 66.

Figure 15:
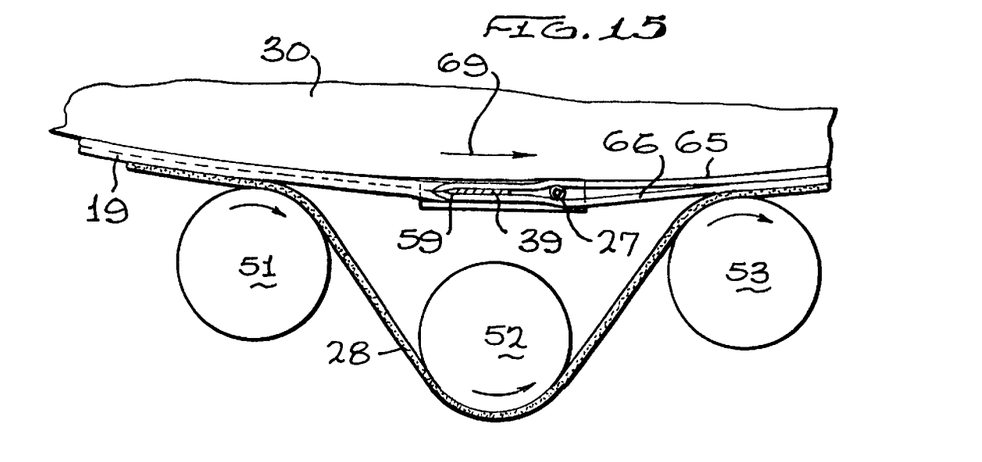
FIG. 15 is a transverse cross-sectional view of the cutter and inflation device as taken in the direction of arrows 15-15 of FIG. 14.

In FIG. 15, the drum 30 and pressure belt 28 drives the supply sheet material 14 in the direction of arrow 69 so that the upper fold 19 is introduced to first the cutter 39 and then as the slit widens, to the nozzle 27 for inflation.

In view of the foregoing, it can be seen that the package filler material machine of the present invention provides a new, novel and improved apparatus and method for inflating a plurality of cells or pouches so that individual pouches or a series of pouches may be separated from a sheet and used for packing purposes in connection with shipping or transporting products. The invention includes a tubular sheet of material which is folded or partially flattened to provide a compartment 64 intended to be inflated with a pressurized fluid and which is further intended to be completely sealed so as to enclose the pressurized compartment. The machine for effecting such inflated cells or pouches includes a storage reel for the sheet material 14 which is then introduced to an upper fold cutting station and to an inflation station by grasping and driving the sheet material 14 via a powered drum and endless belt 28. During the moving, advancement or positioning of the sheet material, the belt presses against the external surface along the top of the sheet material 14 immediately beneath the upper fold 19 so as to force the back side of the material into a gripping connection with the peripheral edge of a drum 30 as shown in FIG. 7. As the pressure belt moves the sheet material against the rotatable drum, the material is temporarily gripped until such time as it reaches the cutter 39 as shown in FIG. 15 and then to the inflation station where idler wheels cause a temporary withdrawal or removal of the belt from engagement with the top of the sheet material so that the inflation means such as nozzle 27 can inflate individual and sequential cells or pouches as the sheet material is moved along. Immediately upon inflation, the belt 28 re-engages with the top edge of the sheet material by idler 53 so that the inflated internal compartments are closed. Next, the sheet material is moved to a sealing station where sealing apparatus effectively seals the top edge marginal region of the sheet material by heat seal or sonic seal to permanently close and seal the internal cell or pouch compartments. As the inflated sheet material is advanced to a discharge station, the belt is taken out of engagement with the inflated sheet material and the inflated sheet material continues to exit or be discharged from the machine for use. Initially, the sheet material includes a plurality of cells or pouches which are separated by seams in order to define the internal storage compartment. It is to be understood that other sealing or closure means can be provided for the plurality of pouches so as to permit introduction of the pressurized fluid into the storage compartment followed by suitable sealing. Tension control is provided for the endless belt and suitable timers, switches, and temperature controls are incorporated into the drive system for the drum and the endless pressure belt. Such components are also tied into the cutting, inflation and sealing stations so that proper control of temperature and timing is provided.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An apparatus for producing a packaging filler product comprising:

a base;

a supply of tubular material carried on said base having a plurality of pockets;

a plurality of work stations operatively mounted on said base in spaced-apart relationship with respect to said supply of tubular material and to each other;

said work stations include a cutter station, an inflation station immediately adjacent to said cutter station, and a sealing station;

advancing means mounted on said base engageable with said supply of tubular material for continuously moving said supply of tubular material past said work stations whereby a cutter at said cutter station is for creating a slit in each of said pockets of said supply of tubular material, an inflation device for momentarily inflating each of said pockets of said continuously moving supply of tubular material and a sealing means at said sealing station for sealing said slit of each of said pockets in said supply of tubular material; and said advancing means includes a single rotary back member and tensioning means forcibly urging a portion of said supply of tubular material against said back member as said supply of tubular material moves from one of said work stations to the next one of said work stations;

said advancing means further includes a detachment means adjacent said cutter and said inflation means for separating said rotary means from said tubular supply preparatory for advancement to said sealing means.

2. The apparatus defined in claim 1 wherein:

said supply of tubular material comprises an elongated tube having opposite walls joined by an upper and a lower fold and defining a pocket compartment therebetween;

said slit provided in said upper fold preparatory for inflation by said inflation device; and said sealing means operable to seal said walls to close said slit in order to retain inflation of said supply of tubular material.

3. The apparatus defined in claim 2 wherein:

said supply of tubular material includes a plurality of spaced-apart strips joining said walls to provide a series of individual pockets between said walls and between said upper fold and said lower fold; and said strips are elongated having one end immediately adjacent to said bottom fold and another end terminating in fixed spaced-apart relationship to said upper fold.

4. The apparatus defined in claim 3 wherein:

a rotatable storage feed reel carried on said base;

a quantity of said supply of tubular material wrapped about said feed reel; and said advancing means is in gripping engagement with said supply of tubular material immediately beneath said upper fold for controllably withdrawing and moving said supply of tubular material from said storage reel.

5. The apparatus defined in claim 4 wherein:

said advancing means includes a powered means having a surface bearing against said supply of tubular material to forcibly engage said material against said rotary back member.

6. The apparatus defined in claim 1 wherein:

said supply of tubular material subsequent to being sealed at said sealing station providing a plurality of inflated pouches.

7. The apparatus defined in claim 6 wherein:

each of said pouches is defined by an inflated storage compartment having peripheral sealing strips surrounding said storage compartment.

8. The apparatus for producing an inflated packaging filler material comprising:

a base;

a tubular supply of plastic-like material having a compartment defined between a top fold and a bottom fold integrally formed with a pair of sheets having opposing surfaces establishing a pouch between pairs of spaced-apart strips extending normal to said top fold and said bottom fold;

a plurality of work stations disposed on said base in spaced-apart relationship and arranged in series for sequentially processing of said tubular supply;

a storage reel rotatably mounted on said base for holding a quantity of said tubular supply;

a first work station of said plurality having a blade cutter adapted to slice said top fold to provide a slit separating said pair of sheets;

a second work station of said plurality having an inflation means insertable into said pouch to introduce a pressurized fluid into said compartment;

a third work station having a sealing means operable to engage said pair of sheets to seal said slit to retain said pressurized fluid in said compartment;

advancement means having a curvilinear means yieldably urging said top fold of said tubular supply against a rotary member carried on said base to move said tubular supply between said plurality of work stations;

said advancement means includes at least one rotary means having a curved peripheral edge surface;

a powered drive means cooperating with said rotary means to engage said tubular supply therebetween in a gripping relationship with said peripheral surface to move said tubular supply from one station of said plurality to another in a continuous and uninterrupted sequence;

said advancement means further includes a plurality of idler rollers mounted on said base and said power drive means includes powered rollers trained about said idler rollers to provide a curvilinear path so as to engage said tubular supply adjacent said top fold in said gripping relationship; and selected ones of said idler rollers arranged in an offset relationship to effect a separation of said power drive means from said tubular supply immediately adjacent to said cutter station and said inflation stations so as to permit insertion of said inflation means through said slit between said pair of sheets.

9. The apparatus defined in claim 8 wherein:

said selected idler rollers include a pair of idler rollers separated by said cutter station and said inflation stations and engageable with said power drive means to press said tubular supply against said rotary means and a third idler roller disposed between said pair of idler rollers in spaced-apart relationship with said tubular supply so as to separate said belt from said tubular supply at said cutter station and said inflation station.

10. The apparatus defined in claim 9 wherein:

said rotary means is a driven roller against which said tubular supply is pressed by said powered drive means and said pair of idler rollers of said selected idler rollers.

11. In an apparatus for producing a package material for article protection during shipping and which is produced from a tubular supply of material that is flat with two material sheets joined at top and bottom edges by integral folds which provided a continuous series of pockets or pouches that are adapted to be sliced at the top fold, inflated between said sheets and sealed to close the ship slit formed by the slice, the combination which comprises:

a cutter for slicing said top fold of said tubular supply;

a fixed inflation means in close proximity to said cutter for introducing a gaseous substance into said pouches in a serial sequence;

sealing means in close proximity to said fixed inflation means for closing said slit;

advancement means having a rotary means in a gripping relationship with said tubular supply to move said tubular supply into and out of operative relationship with respect to said cutter, said inflation means and said sealing means;

a drive member in.said advancement means having a circular peripheral surface;

said rotary means bearing against said tubular supply and urging said tubular supply against said peripheral surface of said drive member to constitute said gripping relationship whereby said tubular supply is moved past said cutter, said inflation means and said sealing means; and said advancement means further includes a detachment means adjacent said cutter and said inflation means for separating said rotary means from said tubular supply preparatory for advancement to said sealing means.

12. In an apparatus for producing a package material for article protection during shipping and which is produced from a tubular supply of material that is flat with two material sheets joined at top and bottom edges by integral folds which provided a continuous series of pockets or pouches that are adapted to be sliced at the top fold, inflated between said sheets and sealed to close the slit formed by the slice, the combination which comprises:

a cutter for slicing said top fold of said tubular supply;

a fixed inflation means in close proximity to said cutter for introducing a gaseous substance into said pouches in a serial sequence;

sealing means in close proximity to said fixed inflation means for closing said slit;

advancement means having a pressure means in a gripping relationship with said tubular supply to urge said tubular supply against a rotary drive member for moving said tubular supply into and out of engagement with respect to said cutter, said inflation means and said sealing means;

said rotary drive member having a circular peripheral surface;

said pressure means bearing against said tubular supply and urging said tubular supply against said peripheral surface to constitute said gripping relationship whereby said tubular supply is moved past said cutter, said inflation means and said sealing means; and said advancement means further includes a detachment means adjacent said cutter and said inflation means for interrupting said gripping relationship by separating said pressure means from said tubular supply adjacent said cutter and said inflation means and preparatory for advancement to said sealing means.

13. The apparatus defined in claim 12 wherein:

said rotary drive member includes a curved backing surface against which said tubular supply is pressed by said pressure means and by said pair of idler rollers of said selected idler rollers.

14. The apparatus defined in claim 12 wherein:

said detachment means includes an arrangement of offset idler rollers adjacent said cutter and said inflation means for releasing said pressure means from said gripping relationship with said tubular supply and for re-establishing said gripping relationship immediately before said sealing means.

15. The apparatus defined in claim 14 including:

said tubular supply having a front edge surface and a back edge surface;

a rotary drive member engageable with said back edge surface of said tubular supply; and said belt engageable with said front edge surface of said tubular supply for forcibly urging said tubular supply into said gripping relationship with said rotary drive member.

16. The apparatus defined in claim 15 including:

a guide wedge mounted with said cutter and inflation means for separating said sheets of said tubular supply preparatory for inflation.

17. In an apparatus for producing a package material for article protection during shipping and which is produced from a tubular supply of material that is flat with two material sheets joined at top and bottom edges by integral folds which provided a continuous series of pockets or pouches that are adapted in a continuous sequence to be sliced at the top fold, inflated between said sheets and sealed to close the slip formed by the slice, the combination which comprises:

a cutter for slicing said top fold of said tubular supply;

a fixed inflation means in close proximity to said cutter for introducing a gaseous substance into said pouches in a serial sequence;

sealing means in close proximity to said fixed inflation means for closing said slit;

continuous operating advancement means having a rotary means in a gripping relationship with said tubular supply to move said tubular supply into and out of operative relationship with respect to said cutter, said inflation means and said sealing means;

a drive member in said advancement means having a circular peripheral surface;

said rotary means bearing against said tubular supply and urging said tubular supply against said peripheral surface of said drive member to constitute said gripping relationship whereby said tubular supply is moved past said cutter, said inflation means and said sealing means; and said advancement means further includes a detachment means adjacent said cutter and said inflation means for separating said rotary means from said tubular supply preparatory for advancement to said sealing means.

\* \* \* \* \*